United States Patent [19]
Wang et al.

[11] Patent Number: 5,465,327
[45] Date of Patent: Nov. 7, 1995

[54] METHOD AND SYSTEM FOR DOCUMENT ADMINISTRATION UTILIZING ICONIC REPRESENTATIONS WITHIN A DATA PROCESSING SYSTEM

[75] Inventors: Diana S. Wang, Trophy Club; Marvin L. Williams, Lewisville, both of Tex.

[73] Assignee: International Business Machines Corporation, Armonk, N.Y.

[21] Appl. No.: 494,014

[22] Filed: Mar. 15, 1990

[51] Int. Cl.$^6$ ............................................. G06F 17/30
[52] U.S. Cl. ........................ 395/159; 395/155; 395/145
[58] Field of Search .................................. 364/518–522; 395/159, 145, 147, 155, 159, 400, 600

[56] References Cited

U.S. PATENT DOCUMENTS 5,021,976  6/1991  Wexelblat et al. .................. 395/159
5,065,347  11/1991  Pajak et al. ......................... 395/159

*Primary Examiner*—Almis R. Jankus
*Attorney, Agent, or Firm*—Jonathan E. Jobe; Andrew J. Dillon

[57] ABSTRACT

A method for document administration within a data processing system which utilizes iconic representations. A bit image or graphic iconic representation is created for selected textual documents and stored as a bit image or graphic object at a selected memory location within the data processing system. A reference or pointer to the memory location of each iconic representation is then stored within a descriptive profile associated with each document. Thereafter, the textual document may be transferred to a user location where graphic or bit image objects may or may not be supported. Upon an examination of the descriptive profile, a subsequent user supporting graphic or image objects may elect to retrieve the iconic representation by utilizing the reference stored therein. By separately storing an iconic representation for each textual document, such documents may be freely interchanged throughout a distributed data processing system whether or not individual users within the system support graphic or image objects. In this manner, those users supporting graphic or image objects may utilize the textual reference stored within each descriptive profile to retrieve an iconic representation for local utilization.

12 Claims, 3 Drawing Sheets

METHOD AND SYSTEM FOR DOCUMENT ADMINISTRATION UTILIZING ICONIC REPRESENTATIONS WITHIN A DATA PROCESSING SYSTEM

BACKGROUND OF THE INVENTION

1. Technical Field

The present invention relates in general to the field of document administration within a data processing system and in particular to the field of document administration utilizing associated iconic representations. Still more particularly, the present invention relates to a method whereby a graphical or image representation of a textual document may be stored at a separate memory location and associated with a textual document by means of a reference or pointer contained within an associated descriptive profile.

2. Description of the Related Art

Graphic or iconic representation of applications, functions or files is well known in the prior art. Specifically, many multi-tasking applications permit background applications to be "tokenized", or displayed as miniature graphic representations so that the user may be kept aware of the presence and functioning nature of these applications. Additionally, certain of these applications permit an iconic representation to be created in association with an application or document.

The aforementioned graphic representations are generally created as either graphical or bit image representations; however, after associating such a graphic representation with a document or application the future transmission of that document is effectively restricted to only those recipients having the capability of supporting the graphical or bit image representation. In this manner, if an iconic or graphic representation of a document is desired a number of users within the system may be precluded from utilizing the document.

In view of the above it should be apparent that a need exists for a method whereby an iconic representation may be associated with a document without requiring all users of the document to support graphical or bit image representations.

SUMMARY OF THE INVENTION

It is therefore one object of the present invention to provide an improved method of document administration within a data processing system.

It is another object of the present invention to provide an improved method of document administration within a data processing system which utilizes associated iconic representations for selected documents.

It is yet another object of the present invention to provide an improved method of document administration within a data processing system which utilizes associated iconic representations which are stored as image or graphic objects at separate memory locations and which are referenced within each document.

The foregoing objects are achieved as is now described. The method of the present invention utilizes iconic representations of selected documents which are stored as bit image or graphical representations at selected memory locations within a data processing system. A reference or pointer to the memory location of each iconic representation is stored within a descriptive profile associated with each document. Thereafter, the textual document may be transferred to a user location where graphic or image objects may or may not be supported. Upon an examination of the descriptive profile, a subsequent user or user application supporting graphic or image objects may elect to retrieve the iconic representation by utilizing the reference stored therein. By separately storing an iconic representation for each textual document, such documents may be freely interchanged throughout a distributed data processing system, whether or not individual users within the system support graphic or image objects. In this manner, those users supporting graphic or image objects may utilize the textual reference stored within each descriptive profile to retrieve an iconic representation for local utilization.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
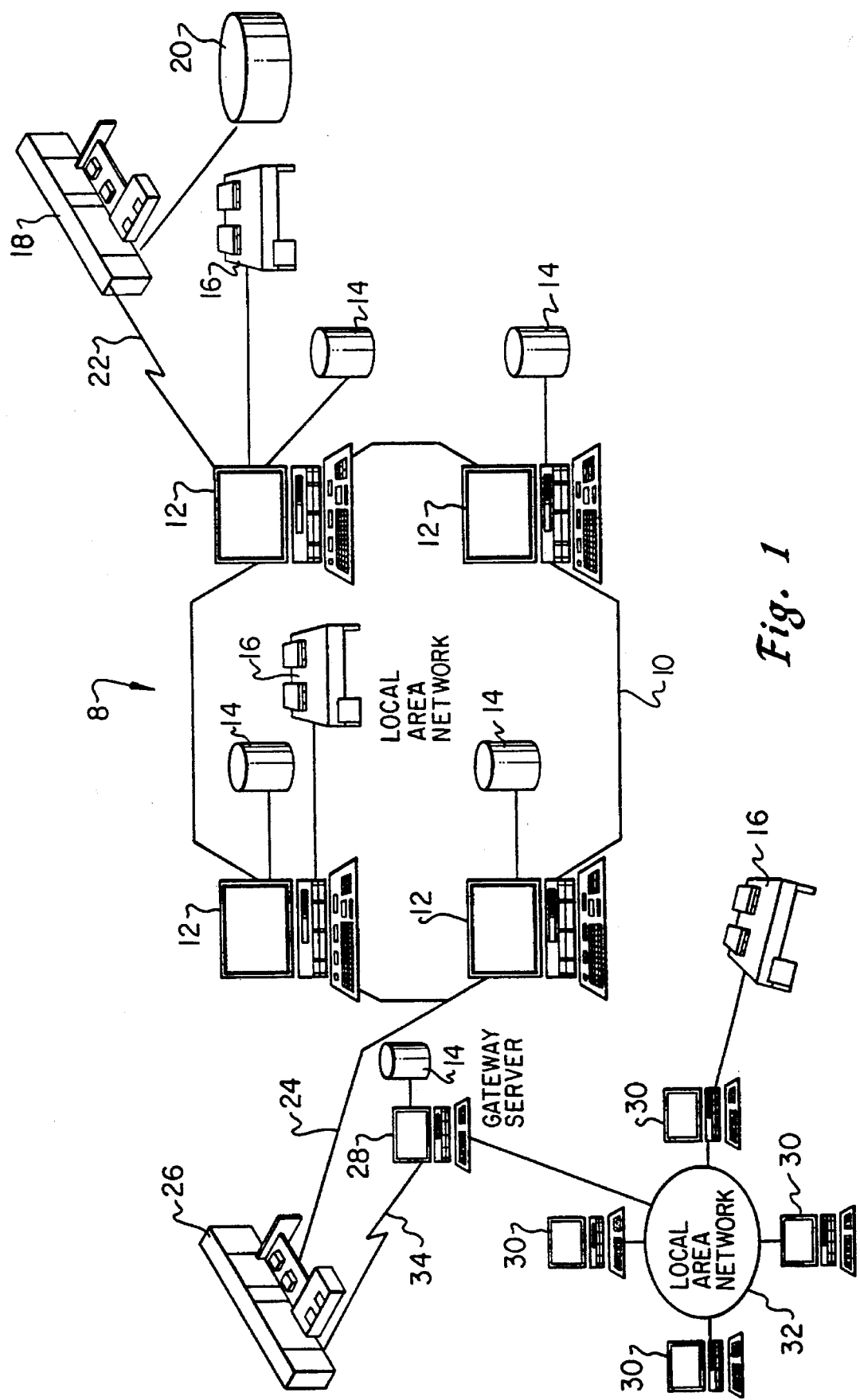
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by main frame computer 18, as Resource Manager or Library Service for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type it is common for a user in one area of distributed data processing system 8 to access a document or resource object within another portion of distributed data processing system 8. This interchange of a document or resource object from one portion of distributed data processing system 8 to another portion of distributed data processing system 8 becomes complicated in the event a graphic or image object, such as an iconic representation, is associated with the document or resource object. This is true because of the fact that one or more of the users within distributed data processing system 8 may not support graphic or image objects. It should therefore be apparent that in a system in which it is desired to associate an iconic representation with a document or resource object within the system, a method must be found to permit the documents having such iconic representations associated therewith to be freely interchanged among users who may or may not support graphic or bit image objects.

Figure 2:
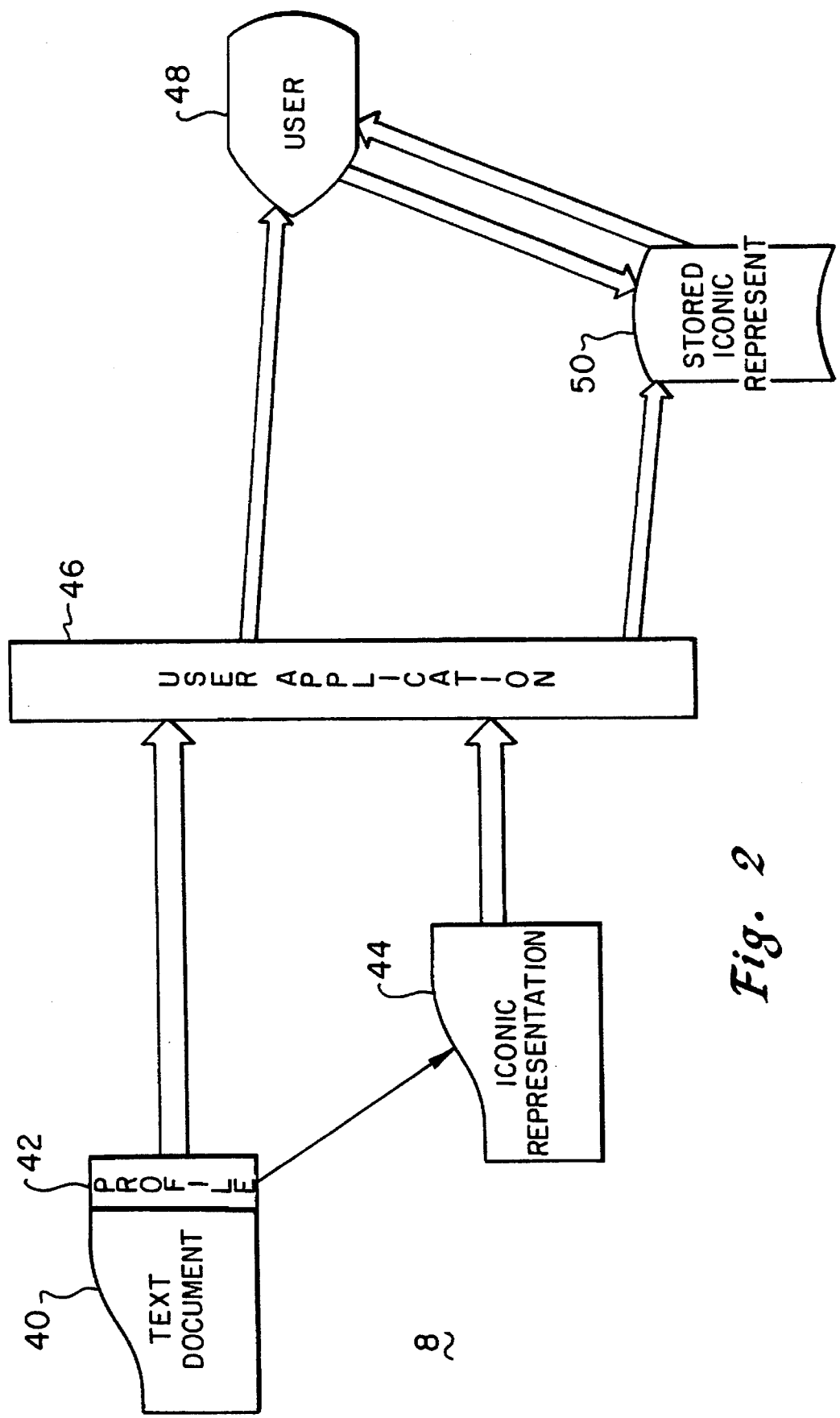
FIG. 2 depicts a schematic representation of the method of document administration utilizing iconic representations in accordance with the method of the present invention.

Referring now to FIG. 2, there is depicted a schematic representation of the method of document administration utilizing iconic representations in accordance with the method of the present invention. As is illustrated, distributed data processing system 8 is depicted as including a text document 40 which has associated therewith a descriptive profile 42. Descriptive profile 42 is preferably a textual profile which includes descriptive information regarding text document 40. In accordance with the method of the present invention, an iconic representation 44 of text document 40 has been created and stored at a separate memory location. A reference or pointer within profile 42 is thereafter utilized to indicate the location within memory wherein iconic representation 44 has been stored.

Next, in the event user 48 retrieves text document 40, via user application 46, the textual portion of text document 40 and descriptive profile 42 may be freely interchanged via user application 46. Upon reference to descriptive profile 42, user 48 may determine whether or not text document 40 has an iconic representation 44 associated therewith and, in the event user 48 supports graphic or bit image objects, iconic representation 44 may also be retrieved via user application 46. Thereafter, stored iconic representation 50 is again stored in an external storage media accessible by user 48. In this manner, the iconic representation associated therewith may be presented to user 48 via user application 46, in manner common in the art.

Figure 3:
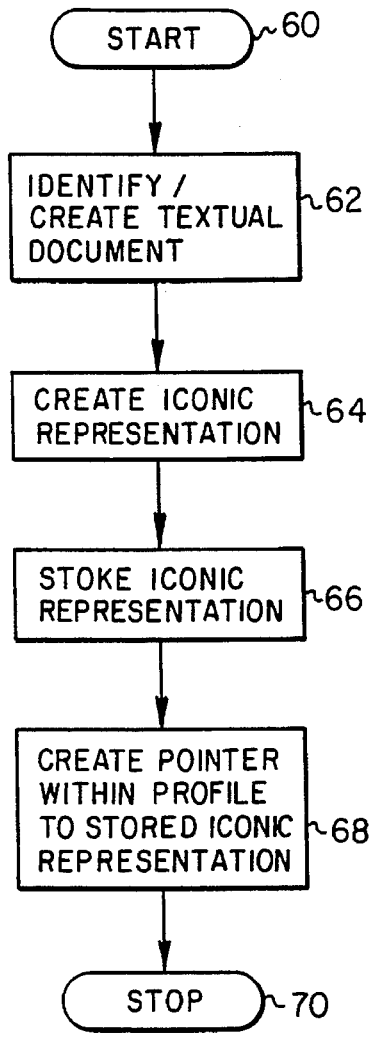
FIG. 3 is a high level flow chart depicting the method of creating an associated iconic representation and the storage of that representation in accordance with the method of the present invention.

With reference now to FIG. 3, there is depicted a high level flow chart depicting the method of creating an associated iconic representation and the storage of that representation in accordance with the method of the present invention. As may be seen, the process begins at block 60 and thereafter passes to block 62 which depicts the identification and/or creation of a textual document. Next, as discussed above, an iconic representation is created, as illustrated in block 64. As those skilled in the art will appreciate, the iconic representation which is created may be utilized to graphically indicate the presence and/or availability of the textual document or resource object associated therewith. Next, the iconic representation thus created is stored, preferably as a Mixed Object Document Content Architecture document (MO:DCA) in a graphic or bit image format. Finally, a reference or pointer is created and stored within the descriptive profile associated with the textual document. The reference or pointer thus stored may be utilized by subsequent users of the textual document to identify the memory location wherein the iconic representation has been stored. Thereafter, the process terminates, as depicted in block 70.

Figure 4:
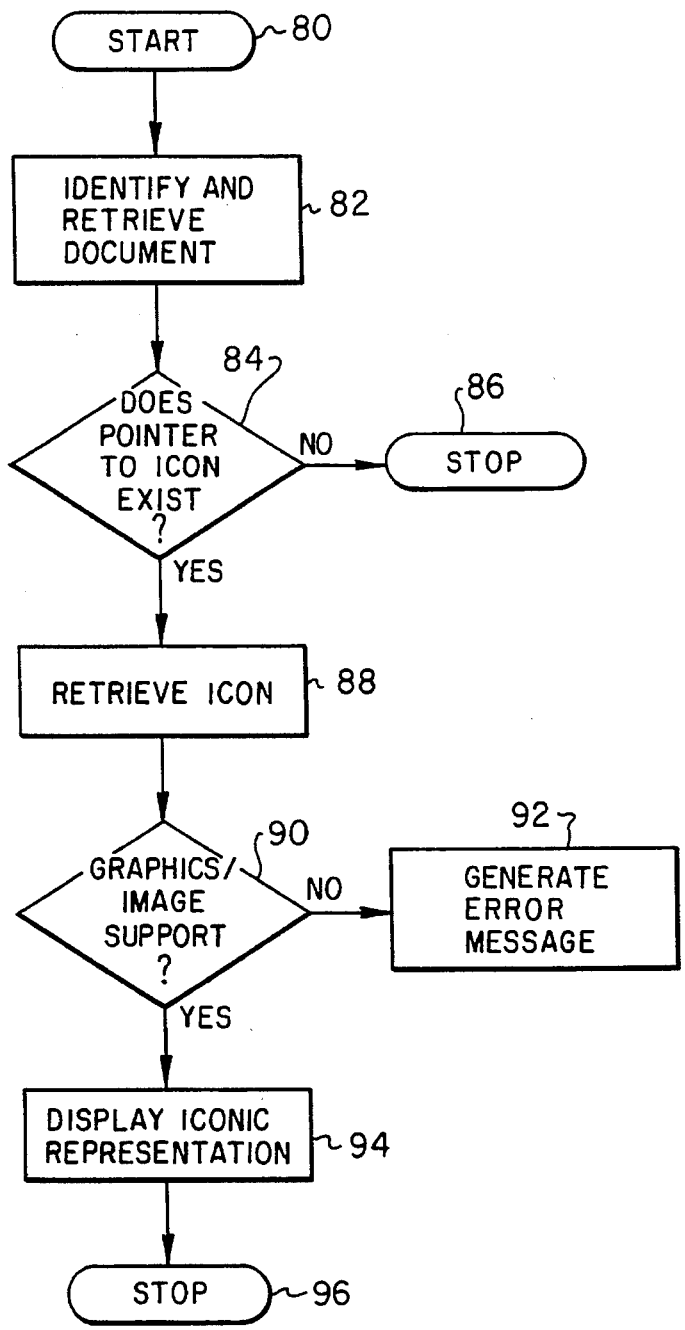
FIG. 4 is a high level flow chart depicting the utilization of the method of the present invention wherein a document having an associated iconic representation has been transferred to a subsequent user.

Referring now to FIG. 4, there is depicted a high level flow chart depicting the utilization of the method of the present invention wherein a document having an associated iconic representation has been transferred to a subsequent user. As is illustrated, the process begins at block 80 and thereafter passes to block 82 which depicts the identification and retrieval of a selected document from some point within distributed data processing system 8 (see FIG. 1). Thereafter, as illustrated in block 84, the descriptive profile associated with the retrieved document is examined to determine whether or not it contains a reference or pointer to an iconic representation. If not, the process terminates, as illustrated in block 86.

In the event the determination illustrated in block 84 indicates that a reference or pointer to an iconic representation does exist within the descriptive profile associated with the retrieved document, then block 88 illustrates the retrieval of that iconic representation. Block 90 next depicts a determination of whether or not the user in question supports graphics and/or bit image objects and if not, an error message is generated, as illustrated in block 92. In the event the user in question does support graphics and/or bit image objects, as determined in block 90, then block 94 illustrates the display of the iconic representation in a manner well known in the art. Thereafter, the process terminates, as illustrated in block 96.

Upon reference to the foregoing those skilled in the art will appreciate that by creating iconic representations associated with selected documents within a distributed data processing system and thereafter storing those iconic representations at separate locations, the Applicants have created a system which permits the free interchange of textual documents having iconic representations throughout a distributed data processing system, without the necessity of requiring each user within the system to support bit image and/or graphic objects. By inserting a reference or pointer to the stored graphic and/or bit image iconic representation within a textual descriptive profile associated with each document those users who do support graphics and/or bit image objects may thereafter retrieve the iconic representation for future utilization in conjunction with the textual document.

While the invention has been particularly shown and described with reference to a preferred embodiment, it will be understood by those skilled in the art that various changes in form and detail may be made therein without departing from the spirit and scope of the invention.

We claim:

1. A method of document administration in a data processing system having a plurality of documents stored therein and accessible by a plurality of user locations within said data processing system, each document having a descriptive profile associated therewith, said method comprising the steps of:

creating an iconic representation of a selected document;

storing said created iconic representation within said data processing system at a first selected memory location;

storing said selected document at a second selected memory location within said data processing system; and entering an indication of said first selected memory location within said descriptive profile associated with said selected document wherein upon a transfer of said selected document and said associated descriptive profile to one of said plurality of user locations a user thereat may elect to separately retrieve said iconic representation utilizing said first indication of said selected memory location within said descriptive profile.

2. The method of document administration in a data processing system according to claim 1, wherein said step of creating an iconic representation of a selected document comprises the step of creating a graphical interpretation of said selected document.

3. The method of document administration in a data processing system according to claim 1, wherein said step of creating an iconic representation of a selected document comprises the step of creating a bit image interpretation of said selected document.

4. The method of document administration in a data processing system according to claim 1, wherein said step of storing said selected document at a second selected memory location within said data processing system comprises the step of storing said selected document as a text only document.

5. The method of document administration in a data processing system according to claim 1, wherein said step of storing said iconic representation at a selected memory location within said data processing system comprises the step of storing said iconic representation as a graphic object.

6. The method of document administration in a data processing system according to claim 1, wherein said step of storing said iconic representation at a selected location within said data processing system comprises the step of storing said iconic representation as an image object.

7. A data processing system having a plurality of user locations for utilization in document administration, said data processing system comprising:

a plurality of documents stored within said data processing system, each of said plurality of documents including an associated descriptive profile and being accessible by said plurality of user locations;

means for creating an iconic representation of a selected document within said plurality of documents;

means for storing said created iconic representation of said selected document within said data processing system at a first selected memory location;

means for storing said selected document at a second selected memory location within said data processing system; and means for entering an indication of said first selected memory location within said descriptive profile associated with said selected document wherein upon a transfer of said selected document and said associated descriptive profile to one of said plurality of user locations a user thereat may elect to separately retrieve said iconic representation utilizing said stored indication of said first selected memory location within said descriptive profile.

8. The data processing system according to claim 7, wherein said means for creating an iconic representation of a selected document within said plurality of documents comprises means for creating a graphical interpretation of said selected document.

9. The data processing system according to claim 7, wherein said means for creating an iconic representation of a selected document within said plurality of documents comprises means for creating a bit image interpretation of said selected document.

10. The data processing system according to claim 7, wherein said means for storing said selected document at a second selected memory location within said data processing system comprises means for storing said selected document as a text only document.

11. The data processing system according to claim 7, wherein said means for storing said iconic representation at a selected memory location within said data processing system comprises means for storing said iconic representation as a graphic object.

12. The data processing system according to claim 7, wherein said means for storing said iconic representation at a selected memory location within said data processing system comprises means for storing said iconic representation as an image object.

* * * * *